Sept. 20, 1960     L. J. WILKINS     2,953,174
CORNER CLAMP

Filed Sept. 10, 1956     2 Sheets-Sheet 1

INVENTOR.
LEON J. WILKINS
BY
*George C. Sullivan*
Agent

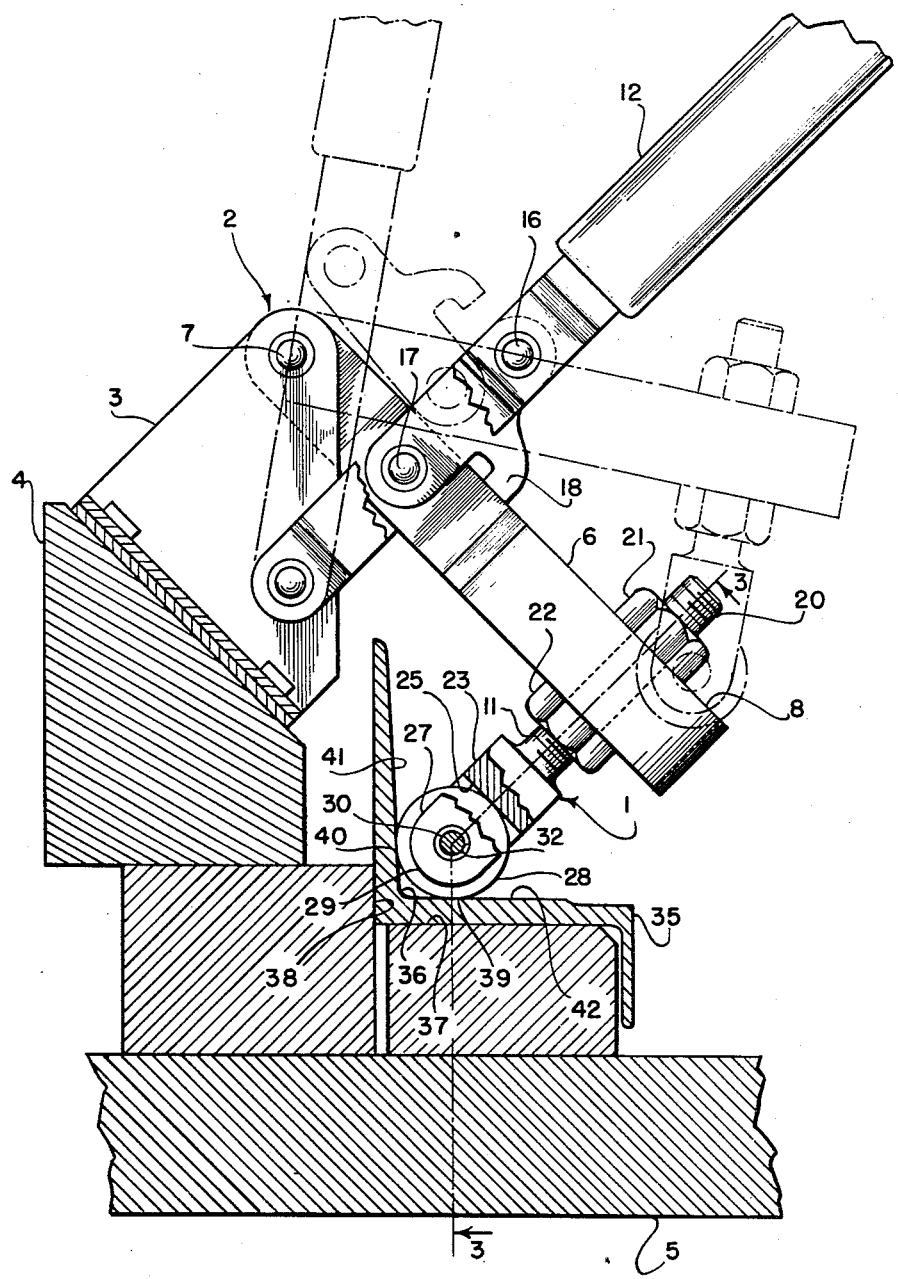

United States Patent Office 2,953,174
Patented Sept. 20, 1960

2,953,174
CORNER CLAMP

Leon J. Wilkins, Temple City, Calif., assignor to Lockheed Aircraft Corporation, Burbank, Calif.

Filed Sept. 10, 1956, Ser. No. 608,844

3 Claims. (Cl. 144—290)

This invention relates generally to clamps and more particularly to a corner clamp having a roller pressure foot which will automatically align itself into a corner on a part for exerting a holding force in two directions.

There are many applications in the manufacturing tooling art where parts having an angular shape in cross-section must be firmly clamped to a seating surface on a tooling jig or fixture for assembling several different parts or performing detail manufacturing operations such as drilling holes or the like. In holding such a part in the jig for proper alignment, forces must be applied to the part in more than one direction. This has been accomplished in the past by the use of clamps which exert a force in only one direction requiring the manipulation of several clamps to grip the angularly displaced walls of the part and hold the same in the proper position. It is obviously a time consuming operation to clamp each wall of the angle part to the jig using conventional clamps. When the clamps for one wall of the part are tightened, part movement to properly seat the other wall on the jig is restrained, requiring simultaneous adjustment of the several clamps.

An object of this invention is to provide a clamp having a roller pressure foot which will automatically adjust to exert a force in two directions for holding a part having an inside corner formed therein.

Another object of this invention is to provide a roller pressure foot for a clamp or the like which is structurally efficient and capable of transmitting high clamping forces directly through the roller.

Another object of this invention is to provide a clamp for exerting a force in two directions on a corner part which is dependable in operation, permitting positive clamping action for automatically seating the part by moving a single control lever.

Further and other objects will become apparent from the reading of the following description especially when considered in combination with the accompanying drawing wherein like numerals refer to like parts.

In the drawing:

Figure 2 is a fragmentary side view of the corner clamp shown in Figure 1; and,

Figure 1:
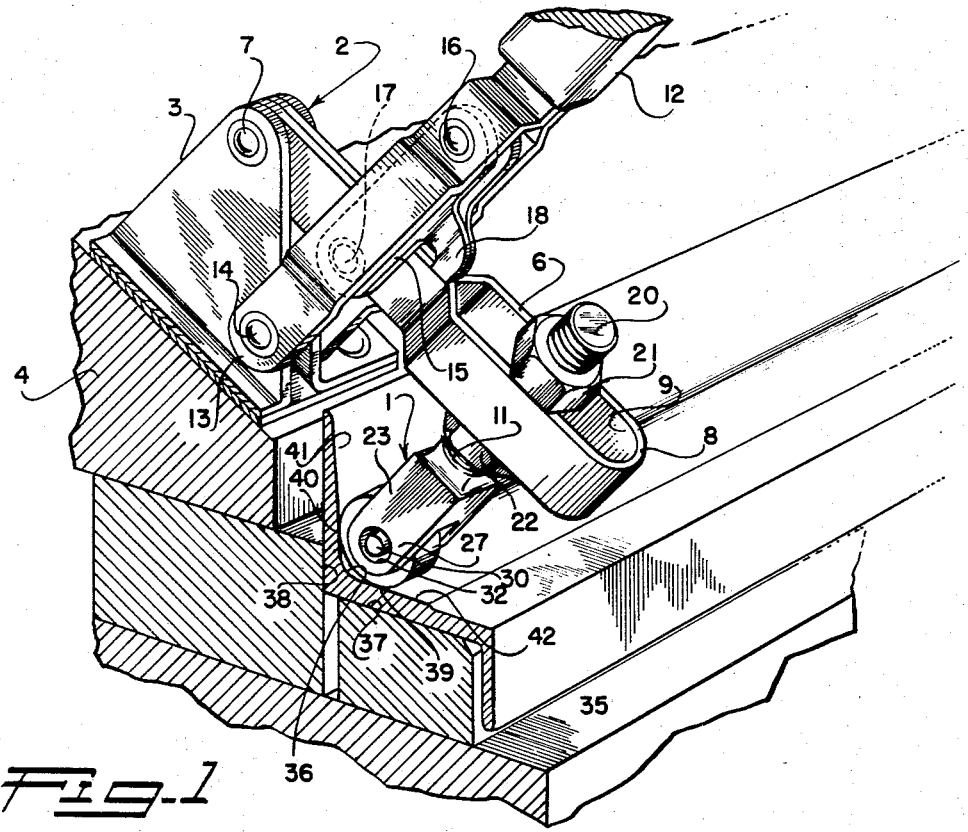
Figure 1 is a perspective view of the corner clamp.
Figure 3:
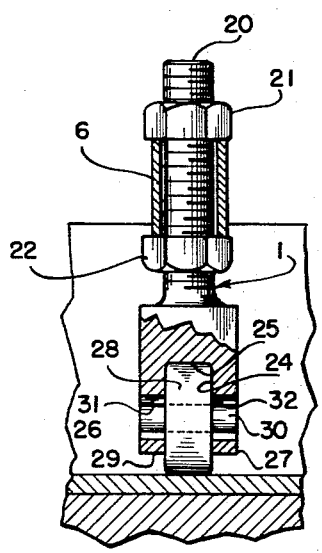
Figure 3 is a front view of the roller pressure foot forming a part of the clamp.

In Figures 1 and 2, roller pressure foot 1 is shown with a toggle type clamp 2 which includes a base 3 secured to the frame 4 of a tooling jig or fixture 5 so as to form a part thereof. A beam 6 is pivotally secured at one end to base 3 through pin 7. The free end 8 of beam 6 is bifurcated to provide a slot 9 for receiving an arm 11 and allowing limited movement thereof along the beam. Slot 9 is aligned generally in the plane of movement of beam 6 as defined by pin 7 so that arm 11 may be made generally straight for efficiently transmitting loads as a column from the roller pressure foot to beam 6. A clevis-like lever 12 is swingably carried at one end 13 by base 3 through pin 14. Control lever 12 connects with beam 6 through an intermediate lever 15 forming a toggle linkage with lever 12. Intermediate lever 15 is pivotally connected with lever 12 through pin 16 and with beam 6 through pin 17. By simply swinging control lever 12 about pin 14, beam 6 is caused to swing in the same direction about its pivot connection. A detent 18 formed on intermediate lever 15 prevents movement of control lever 12 beyond a past dead center position, in one direction only, to lock beam 6 in a fixed position relative to base 3. By proper location of pivot pins 7, 14, 16 and 17 a variable mechanical advantage may be obtained to permit easy manual actuation of the clamp to exert relatively high forces at the dead center position of the toggle arrangement and still permit sufficient angular movement of beam 6 to get it out of the way when the clamp is released.

Roller pressure foot 1 includes arm 11 which extends through slot 9 on beam 6. Arm 11 is provided with a threaded shank portion 20 for receiving a pair of nuts 21 and 22 arranged one on either side of the beam for fixedly securing arm 11 thereto. A head 23 formed on one end of arm 11 has a slot 24 formed therein providing a generally flat seating surface 25 recessed between a pair of spaced flanges 26 and 27. A roller 28 having a diameter greater than the depth of slot 24 as measured from the extreme tip end 29 on head 23 to the seating surface 25, is slidably received within the slot for engaging the generally flat seating surface 25. A pin 30 extending axially through roller 28 projects into oversized openings 31 and 32 in flanges 26 and 27 respectively to keep the roller attached to the pressure foot and yet allow considerable movement of the roller in a radial direction. Oversized openings 31 and 32 are located relative to seating surface 25 such that when roller 28 is in engagement with the mid portion of the seating surface, pin 30 is concentric with the openings. Thus, maximum travel of the roller along the seating surface is accomplished for a given size opening.

Instead of a circular configuration for openings 31 and 32, it is believed obvious that elongated openings could be used to permit lateral movement of roller 28 along seating surface 25 without departing from the teachings of the invention, however the circular opening as shown is considered preferable in that more freedom of movement is provided for the roller in automatically assuming a properly aligned position without loading pin 30. The rotational axis of roller 28 as defined by pin 30 is arranged parallel with the rotational axis of beam 6 so that as the beam is swung towards the locked position, the roller may engage the part and move freely for automatic alignment.

By transmitting the clamping forces into the clamp directly through roller 28 rather than through pin 30 and flanges 26 and 27, an efficient arrangement is obtained for exerting high clamping forces and at the same time the roller is permitted to move laterally for proper seating in this corner of the part.

A typical use of the clamp is shown in Figure 2 wherein a part 35 having a corner 36 formed therein is to be nested on mating seating surfaces 37 and 38 of tooling jig 5 and held firmly in place on the tooling jig for performing detail manufacturing or assembly operations.

In seating part 35 in the proper position on jig 5 it is obviously necessary to exert a holding force on the part in two directions. The clamping forces in the two directions for seating the part against both surfaces 37 and 38 must be applied substantially at the same time. If the part is firmly gripped by clamping force in one direction for nesting against seating surface 37 for example, friction between the part and jig will prevent movement of the part in the other direction for nesting against seating surface 38.

The application of the clamping forces in two directions at substantially the same time is accomplished automatically by the roller pressure foot by simply moving control lever 12 on clamp 2 to the locked position shown in the drawing. As beam 6 is swung into the locked position, roller 28 rolls on seating surface 25 in a lateral direction relative to arm 11 to center itself in corner 36 of part 35 and transmit the clamping forces at the two points of contact 39 and 40 to nest the same against seating surfaces 37 and 38 on the jig. The two clamping forces will be substantially equal so long as the axis of arm 11 bisects the angle defined by the inside surfaces 41 and 42 of the part. This of course is the ideal situation, however differences in the forces applied in the two directions by the clamp do not cause difficulty in properly seating the part with the jig so long as those differences are not large. Therefore, in most applications the proper angular relationship between arm 11 and the part need be only approximately established.

Coarse adjustment for the clamp in a specific application is made by loosening nuts 21 and 22 and sliding arm 11 within slot 9 along beam 6 until the pressure foot is approximately positioned and the fine adjustment automatically is accomplished by lateral movement of roller 28 forming a part of the roller pressure foot. Once the clamp is set up on a jig, parts may be quickly moved into position by simply moving control lever 12 to the toggle locking position. The parts may be removed from the jig with equal facility by simply moving control lever 12 in a counter-clockwise direction as viewed in Figure 2, causing beam 6 and roller pressure foot 1 to swing about pin 7 and away from the part.

The diameter of roller 28 must be large enough to clear the fillet in corner 36 of the part if the forces in two directions are to be produced. This, however, is not considered to be essential to the teachings of this invention inasmuch as even if this relationship were not maintained, the roller would automatically seat itself to force the part into the nesting position of the jig by a single concentrated force representing the resultant of the two separate forces produced when the diameter of the roller is larger than the radius of curvature of the part.

While the clamp has been described in connection with a specific type of clamp actuating linkage, it is merely for illustrative purposes. Obviously, any type of actuating mechanism may be employed and still obtain the benefits of the teachings set forth hereinabove. Accordingly, it should be understood that certain alterations, modifications and substitutions may be made to the instant disclosure without departing from the spirit and scope of this invention as defined by the appended claims.

I claim:

1. A toggle clamp for holding parts having an inside corner formed therein comprising, a frame on which a part may be supported, a beam pivotally secured at one end thereof to said frame, a toggle lever pivotally secured to both said frame and beam for releasably locking the beam in a fixed position relative to the frame, an arm secured to the free end of said beam and extending transversely therefrom, said arm having a slot formed in one end thereof providing a seating surface transversely of the arm, a roller received within said slot and arranged to contact said seating surface and project beyond the end of said arm for engaging the inside corner of the part, and a pin concentrically carried by said roller and projecting from both sides thereof, said arm having an opening formed transversely therethrough and intersecting said slot for receiving said pin, the size of said opening being larger than the outside diameter of said pin whereby said roller may move laterally relative to said arm while in engagement with said seating surface for automatically adjusting to exert a clamping pressure in two directions on the inside corner of the part.

2. A toggle clamp for holding parts having an inside corner formed therein comprising, a frame on which a part may be supported, a beam pivotally secured at one end thereof to said frame, a toggle lever pivotally secured to both said frame and beam for releasably locking the beam in a fixed position relative to the frame, an arm secured to the free end of said beam and extending transversely therefrom, said arm having a slot formed in one end thereof providing a seating surface transversely of the arm, a roller received within said slot and arranged to contact said seating surface and project beyond the end of said arm for engaging the inside corner of the part, and pin means loosely connecting the roller with said arm whereby said roller may move laterally relative to said arm while in engagement with said seating surface for automatically adjusting to exert a clamping pressure in two directions on the inside corner of the part.

3. A clamp for holding parts having an inside corner formed therein comprising, a frame on which a part may rest, an arm carried by said frame and being movable relative thereto, said arm having a generally flat seating surface formed on one end thereof, a roller loosely carried by said arm for engaging said seating surface throughout limited lateral movement of the roller relative to the arm, said roller projecting beyond the one end to engage the inside corner of the part and exert a force gripping the part between the frame and arm.

References Cited in the file of this patent

UNITED STATES PATENTS

| | | |
|---|---|---|
| 1,393,059 | White | Oct. 11, 1921 |
| 1,952,453 | Mueller | Mar. 27, 1934 |
| 2,054,572 | McKenna | Sept. 15, 1936 |
| 2,350,034 | Herrington | May 30, 1944 |
| 2,386,567 | Olson | Oct. 9, 1945 |
| 2,456,100 | Wood | Dec. 14, 1948 |

FOREIGN PATENTS

| | | |
|---|---|---|
| 297,520 | Germany | May 3, 1917 |